(12) United States Patent
Karlelid et al.

(10) Patent No.: US 8,060,163 B2
(45) Date of Patent: Nov. 15, 2011

(54) SEAMLESS SLIDER

(75) Inventors: Torbjorn Karlelid, Malmo (SE);
Gustav Fagrenius, Dalby (SE)

(73) Assignee: Sony Ericsson Mobile Communication AB, Lund (SE)

( * ) Notice: Subject to any disclaimer, the term of this patent is extended or adjusted under 35 U.S.C. 154(b) by 918 days.

(21) Appl. No.: 12/045,758

(22) Filed: Mar. 11, 2008

(65) Prior Publication Data

US 2009/0233647 A1    Sep. 17, 2009

(51) Int. Cl.
*H04M 1/00* (2006.01)

(52) U.S. Cl. ............... 455/575.4; 455/550.1; 455/575.8

(58) Field of Classification Search ............... 455/575.4, 455/550.1, 575.1, 90.3, 575.8
See application file for complete search history.

(56) References Cited

U.S. PATENT DOCUMENTS

| | | | |
|---|---|---|---|
| 7,003,104 B2 * | 2/2006 | Lee | 379/433.13 |
| 7,319,892 B2 * | 1/2008 | Kato | 455/575.4 |
| 7,403,612 B2 * | 7/2008 | Nishihara | 379/433.12 |
| 7,463,913 B2 * | 12/2008 | Nagashima | 455/575.4 |
| 7,561,443 B2 * | 7/2009 | Todoroki et al. | 361/814 |
| 2002/0067924 A1 | 6/2002 | Yamazaki et al. | |
| 2006/0128449 A1 | 6/2006 | Park | |

FOREIGN PATENT DOCUMENTS

| | | |
|---|---|---|
| DE | 299 01 879 U1 | 7/1999 |
| EP | 1 496 671 A1 | 1/2005 |
| WO | 2006/106374 A1 | 10/2006 |

OTHER PUBLICATIONS

International Search Report, corresponding to PCT/EP2008/061562, mailed May 7, 2009.
Written Opinion, corresponding to PCT/EP2008/061562, mailed May 7, 2009.
International Preliminary Report on Patentability, corresponding to PCT/EP2008/061562, mailed Jun. 29, 2010.

* cited by examiner

*Primary Examiner* — Sonny Trinh
(74) *Attorney, Agent, or Firm* — Renner, Otto, Boisselle & Sklar, LLP

(57) ABSTRACT

The present invention relates to a radio communication terminal comprising a first casing, a second casing and a slider mechanism, comprising a slider and a base, the slider is mounted on either one of the first casing and the second casing and the base is mounted on the other of the first casing and the second casing, wherein the first casing is adapted to be moved in relation to the second casing in a first and a second direction between at least a first and a second position, and wherein said first and second directions are situated in a two dimensional plane.

18 Claims, 4 Drawing Sheets

SEAMLESS SLIDER

TECHNICAL FIELD

The present invention involves a radio communication terminal comprising a first casing, a second casing and a slider mechanism, comprising a slider and a base, the slider is mounted on either one of the first casing and the second casing and the base is mounted on the other of the first casing and the second casing.

BACKGROUND ART

The first commercially attractive cellular phones or terminals were introduced in the market at the end of the 1980's. Since then, a lot of effort has been made in making smaller radio communication terminals, with much help from the miniaturisation of electronic components and the development of more efficient batteries. Today, numerous manufacturers offer pocket-sized radio communication terminals with a wide variety of capabilities and services.

In order to attract customers the terminal manufacturers have therefore taken further measures to strengthen their position in the competition. Size and cost is getting more and more essential in mobile handsets design. The marked trend is that mobile handsets are getting thinner.

Another market trend is that the shell of the mobile handset is divided into an upper and lower casing. The upper casing is connected to and movable in one dimension in relation to the lower casing via a slider mechanism.

The slider mechanism comprises a slider that is slidable connected to a base. The slider is connected to the upper casing and the base is connected to the lower casing. A spring member is in one end connected to the slider and in the other end connected to the base. When the mobile handset is arranged in its closed position, the spring member presses the slider away from the base and locks the upper casing on top of the lower casing. To arrange the mobile handset in its open position, the upper casing is slidable moved in relation to the lower casing. The slider is moved towards the base and the spring member is compressed and rotated around its connection to the base. As the upper casing is moved further, the first end of the spring member has been moved passed the second end of the spring member. The spring member is now able to expand and to press the slider away from the base in an opposite direction compared to the closed position. The mobile handset is now arranged in its open position.

One known problem with prior art is that the slider mechanism takes up a lot of space as it is moved between the open and closed position.

SUMMARY OF THE INVENTION

A radio communication terminal defined in claim 1 is provided according to the present invention.

More specifically the invention relates to a radio communication terminal comprising a first casing, a second casing and a slider mechanism, comprising a slider and a base, the slider is mounted on either one of the first casing and the second casing and the base is mounted on the other of the first casing and the second casing, wherein the first casing is adapted to be moved in relation to the second casing in a first and a second direction between at least a first and a second position, wherein said first and second directions are situated in a two dimensional plane.

An advantage of such a radio communication terminal is that the movement of the first and the second casings in a first and a second direction reduces the need of that the surfaces between said casings has to be flat.

Another advantage is that the first casing for instance could hide a device on the second casing in the first position and disclose it in the second position.

The first direction can be a direction in which the first and the second casings are moved away from each other. An advantage of this is that a cooling of the casings could be achieved if air could pass between the casings.

A further advantage is that the shape of the surfaces between the first and the second casing does not affect the movement in the first direction.

The second direction can be a direction in which the first and the second casings are displaced in relation to each other. This is a good and effective manner to disclose devices that are hidden in the first position.

The first position can be a closed position, in which the first casing is arranged on top of the second casing, and the second position can be an open position, in which the first casing is displaced in relation to the second casing.

The first casing can be pressed against the second casing in the first position. An advantage of this is that the dimensions of the radio communication terminal could be reduces as there do not have to be any play between the casings.

A further advantage is that the risk of that dust and particles entering between the casings is reduced.

The first casing can comprise a protrusion and the second casing can comprise a cavity, wherein the protrusion could be adapted to be arranged in the cavity of the second casing in the first position. An advantage of this is that the size of a devise such as a camera that is arranged in the first casing could be increased without increasing the size of the radio communication terminal.

The first casing can be locked against the second casing in the first position and wherein the first casing is adapted to be unlocked when the first casing is moved in the first direction. An advantage of this is that any unintentional movement between the casings could be avoided. A good and secure way to obtain the lock can be to let the protrusion of the first casing act as a lock.

To reduce the risk of that dust and particles enters between the casings, one of the first and the second casings can comprise a resilient flange arranged along the circumferential periphery of a side of said casing that is directed towards the other of the first and the second casing.

The resilient flange of one of the first and the second casings can be adapted to be pressed against the other of the first and the second casings in the first position. An advantage of this is that the risk of that dust and particles enters between the casings is further reduced. A further advantage is that the radio communication terminal could be made weather proof, since the resilient flange could reduce the risk of that water, moist and other fluids enters between the casings.

To even further improve the resistance against moist and fluids, the other of the first and the second casing can comprise a groove, wherein the shape of the groove corresponds to the shape of the resilient flange and wherein the resilient flange can be adapted to be arranged in the groove in the first position.

To enhance the functionality of a device and/or to increase the available space for the device, one of the first and the second casings can comprise a second cavity and the other of the first and the second casing can comprise a device, wherein the device is adapted to be arranged at the second cavity in the second position.

One advantage of this is that the device can be a speaker and the second cavity can be a sound board.

An advantageous way of moving the casing could be that the first casing can be adapted to be slidable movable between the first and the second position.

To achieve a smooth and effective movement for a user, the first casing can be adapted to be moved in relation to the second casing in the first and the second direction simultaneously.

To even further obtain advantageous effect, the first casing can be adapted to be moved in relation to the second casing in a third direction in addition to the first and the second direction.

The third direction can be situated in said two dimensional plane.

The first, second and third direction can be directed in three dimensions.

The first direction can be perpendicular to the second direction.

The first direction can be perpendicular to the third direction.

BRIEF DESCRIPTION OF THE DRAWINGS

The features and advantages of the present invention will be more apparent from the following description of preferred embodiments with reference to the accompanying drawings, in which FIG. 1 schematically illustrates a cross section of a radio communication terminal according to prior art.

DETAILED DESCRIPTION

The present description relates to the field of radio communication terminals. The term radio communication terminal or communication terminal includes all mobile equipment devised for radio communication with a radio station, which radio station also may be mobile terminal or e.g. a stationary base station. Consequently, the term radio terminal includes mobile telephones, pagers, communicators, electronic organisers, smart phones, PDA:s (Personal Digital Assistants) and DECT terminals (Digital Enhanced Cordless Telephony).

Embodiments of the present invention relate, in general, to a radio communication terminal, such as a mobile phone. However, for the sake of clarity and simplicity, most embodiments outlined in this specification are related to mobile phones.

In the following description reference is made to the accompanying drawings. In this regard directional terminology, such as "top", "bottom", "front", "back" etc, is used with reference to the orientation of the figures being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present protection. The following detailed description is not to be taken in a limiting sense, and the scope of the present invention is defined by the appended claims.

Furthermore, it should be emphasised that the term comprising or comprises, when used in this description and in the appended claims to indicate included features, elements or steps, is in no way to be interpreted as excluding the presence of other features elements or steps than those expressly stated.

Figure 1:
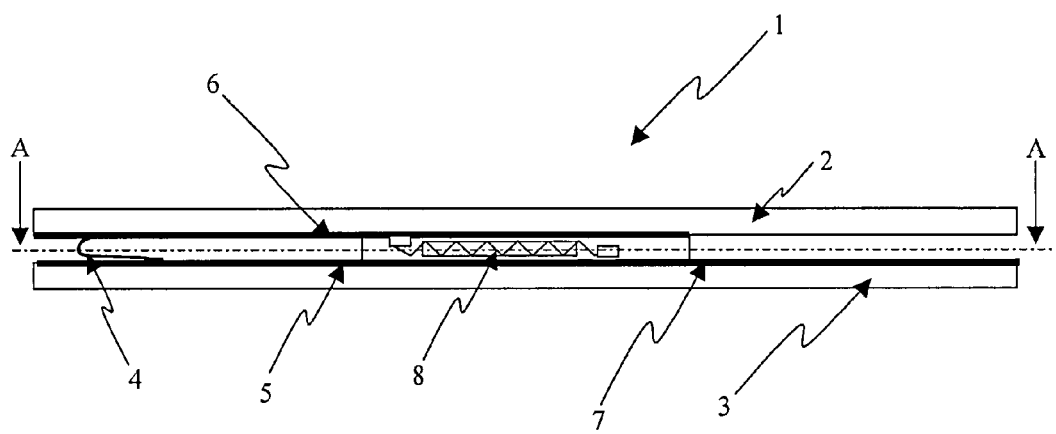
Figure 2:
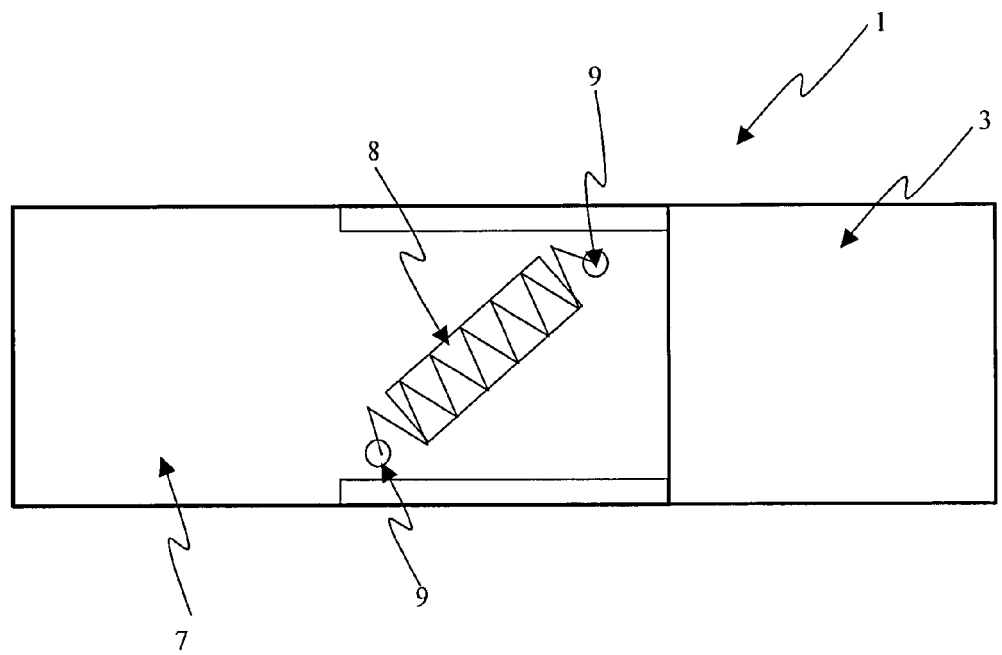
FIG. 2 schematically illustrates cross sectional view along the line A-A in FIG. 1 of a radio communication terminal according to prior art FIG. 3a schematically illustrates a cross sectional view of a first embodiment according to the invention in a first position.

FIGS. 1 and 2 discloses a radio communication terminal 1 according to prior art and comprise a first casing 2, a second casing 3, a communication device 4 and a slider mechanism 5.

The first casing 2 and the second casing 3 could comprise a key pad, a display, a microphone, a speaker and a camera (not disclosed). These devices (and others) are known and disclosed in prior art and will thus not be described in this application. The devices in the first casing 2 communicates with the devices in the second casing 3 via wires in the communication device 4.

The slider mechanism 5 comprises a slider 6, a base 7 and a spring 8. The spring 8 is in one end 9 rotatable connected to the slider 6 and in the other end 9 rotatable connected to the base 7. The base 7 comprise a groove (not disclosed) in which the slider 6 is slidable arranged in.

The slider 6 is mounted on the first casing 2 and the base 7 is mounted on the second casing 3. The first casing 2 is slidable movable in relation to the second casing 3 between a closed position and an open position. The radio communication terminal 1 disclosed in FIG. 1 is in the closed position. To move the radio communication terminal 1 from its closed to its opened position the first casing 2 is moved in relation to the second casing 3. As the first casing 2 is moved, the slider 6 is moved together with it. The slider 6 is moved in a direction such that the ends 9 of the spring 8 are moved towards each other and the spring 8 is compressed. When the slider 6 is moved further, the ends 9 of the spring 8 are moved passed each other. The spring 8 is now able to flex back and expand. As it expands it moves the first casing 2 in relation to the second casing 3 to the opened position. During this movement the slider 6 slides in the groove of the base 7.

The spring 8 is moved for a relatively long distance between the first and the second casings 2, 3. The spring 8 takes up nearly the whole width of the said casings 2, 3.

Exemplary embodiments of the invention will now be described with references made to the FIG. 3-5.

Figure 3A:
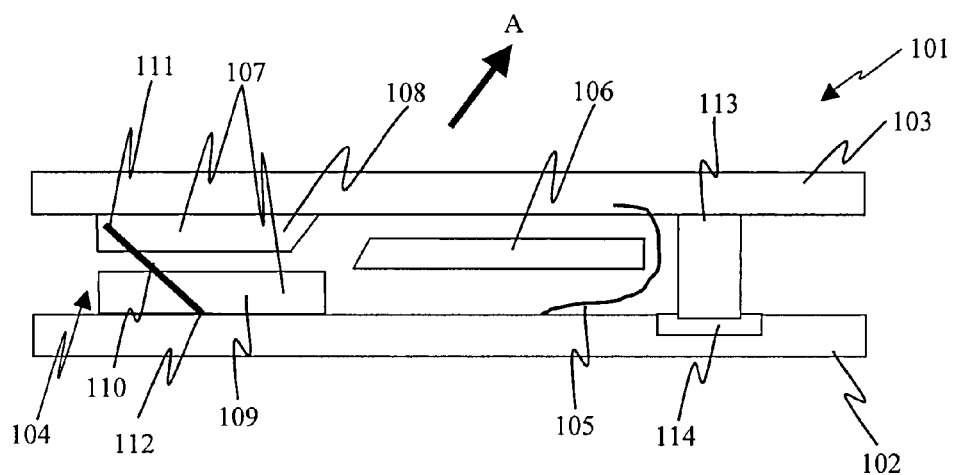
FIG. 3b schematically illustrates a cross sectional view of a first embodiment according to the invention in a second position.
Figure 3B:
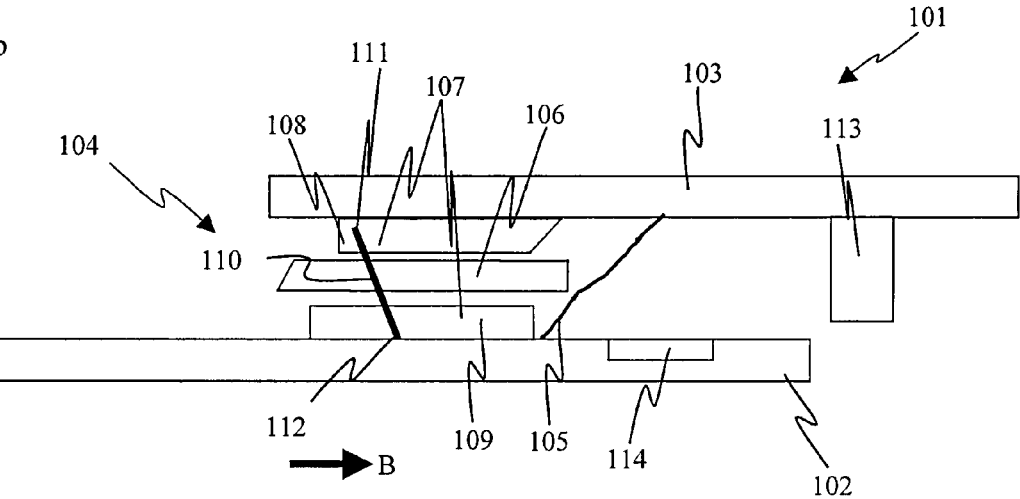

FIG. 3a-3c disclose a first embodiment of a radio communication terminal 101 according to the invention. The radio communication terminal 101 comprises a firs casing 102, a second casing 103, a sliding mechanism 104 and a communication device 105.

The first casing 102 and the second casing 103 could comprise a key pad, a display, a microphone, a speaker and a camera (not disclosed). These devices (and others) are known and disclosed in prior art and will thus not be described in detail in this application. The devices in the first casing 102 communicates with the devices in the second casing 101 via the communication device 105.

The slider mechanism 104 comprises a base 106 and a slider 107. The slider 107 comprises a first and a second plate 108, 109 and a connector 110. A first end 111 of the connector 110 is rotatable connected to the first plate 108 and a second end 112 of the connector 110 is rotatable connected to the second plate 109. The first plate 108 is movable in relation to the second plate 109 in a first direction A. When the first plate 108 is moved, the first and the second end 111, 112 of the connector 110 rotate.

The second plate 109 of the slider 102 is slidable connected to the base 103. The second plate 109 is slidable in relation to the base 103 in a second direction B.

The base 106 is mounted on the first casing 102 (not visible in the figures).

The first plate 108 of the slider 107 is mounted on the second casing 103.

The second casing 103 is movable in relation to the first casing 102 between a firs position and a second position. In the first position, see FIG. 3a, the second casing 103 is arranged on top of the first casing 102. In the second position, see FIG. 3b, the second casing has been displaced in a first dimension in relation to the first casing and been moved away from the first casing in a second dimension.

To move the second casing 103 from the first position to the second position, a user of the radio communication terminal 101 grabs the first and the second casing 102, 103. The first plate 108 is moved in relation to the second plate 108 in the first direction A. As the first plate 108 is connected to the second casing 103 and the second plate 109 is connected to the base 106, the second casing 102 is also moved in the first direction A in relation to the first casing 102.

Thereafter the second plate 109 is slided in the second direction B in relation to the base 106. As the second plate 109 is slided in relation to the base 106 in the second direction, the second casing 103 is moved in relation to the first casing 102 in the second direction B. The first and second directions A, B are not parallel and located in a plane, i.e. the second casing 103 is moved in two dimensions in relation to the first casing 102. The second casing 103 is now arranged in the second position, see FIG. 3b. A key pad, a camera, a display or any other device on the first casing 102 that has been hidden by the second casing 101 could now be visible to a user.

To once again arrange the first and second casing 102, 103 in the first position the steps disclosed above is reversed.

The surfaces between the first and the second casings do not have to be flat to move the second casing 103 between the first and the second position. A device 113 arranged in the second casing 103 could for instance be located in a cavity 114 of the first casing in the first position. A device such as a speaker could be arranged on top of a second cavity in the first or the second position and the second cavity could be arranged to be a sound board.

The connector 110 could be a spring and/or resilient to press the first casing 102 against the second casing 103.

Figure 4A:
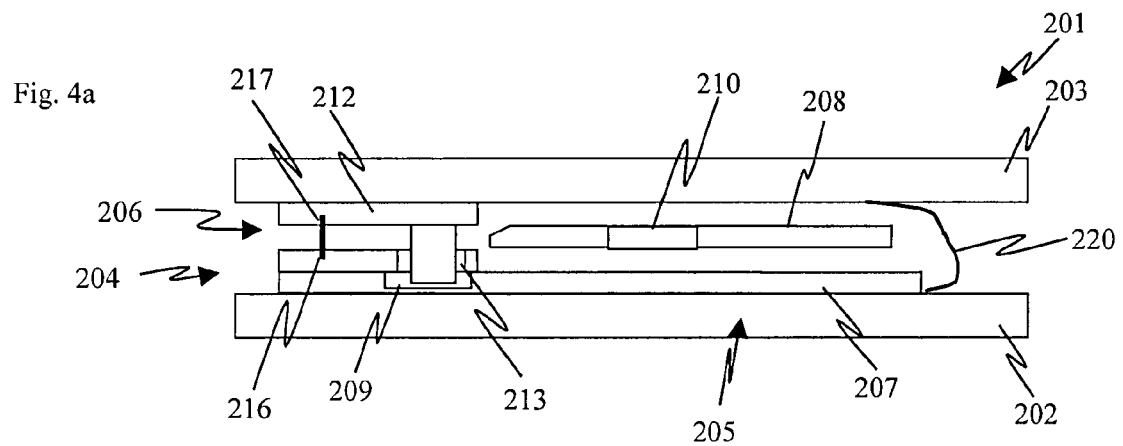
FIG. 4a schematically illustrates a cross sectional view of a second embodiment according to the invention in a first position.
Figure 4B:
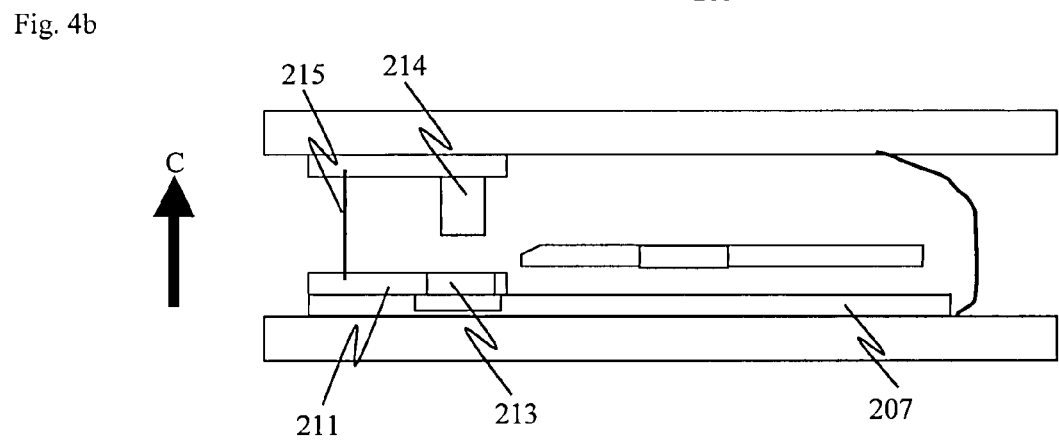
FIG. 4b schematically illustrates a cross sectional view of a second embodiment according to the invention in position between the first position and the second position.
Figure 4C:
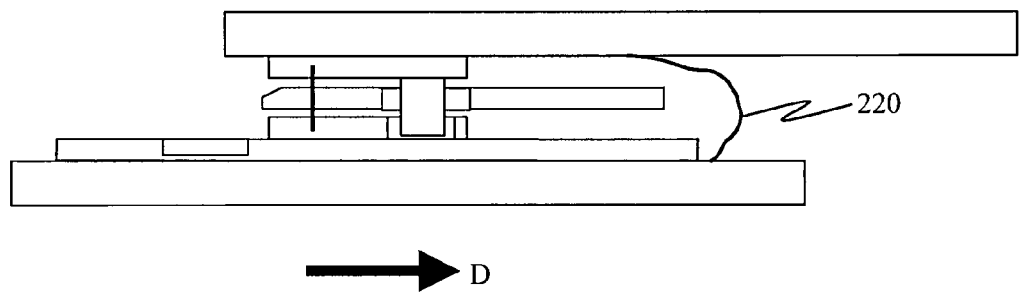
FIG. 4c schematically illustrates a cross sectional view of a second embodiment according to the invention in a second position.

A second embodiment of a radio communication terminal according to the invention is disclosed in FIG. 4a-4c, to which reference now is made. The radio communication terminal 201 comprises a first casing 202, a second casing 203, a slider mechanism 204 and a communication device 220.

The first and the second casing 202, 203 correspond to the first and the second casings 102, 103 described in connection to FIG. 3. The communication device 203 corresponds to the communication device in connection to FIG. 3.

The slider mechanism 203 comprises a base 205 and a slider 206.

The base 205 comprise a first base plate 207 and a second base plate 208. The first base plate 207 is mounted on the first casing and comprises a locking cavity 209. The second base plate 208 is connected to the first base plate 208 and comprises a second cavity 210.

The slider 206 comprises a first sliding plate 211, a second sliding plate 212 and a connector 215. The first sliding plate 211 comprises a transport cavity 213. The second sliding plate 212 comprises a locking projection 214. The second sliding plate 212 is movable in relation to the first sliding plate 211 in a first direction C between a locked position in which the locking projection 214 in arranged in the transport cavity 213 and a transport position in which the projection 214 not is arranged in the transport cavity 213. A first end 216 of the connector 215 is connected to the first sliding plate 211 and a second end 217 of the connector 215 is connected to the second plate 212. The connector 215 is resilient in at least the first direction C. In the locked position the connector 215 presses the first sliding plate 211 against the second sliding plate 212.

The second sliding plate 212 is mounted on the second casing 203.

The first sliding plate 211 is slidable connected to the second base plate 208. The first sliding plate 211 is slidable in relation to the second base plate 208 in a second direction D.

The second casing 203 is movable in relation to the first casing 202 between a first position and a second position. In the first position, see FIG. 4a, the second casing 203 is arranged on top of the first casing 202 and the locking projection 214 is arranged in the transport cavity 213 of the first sliding plate 211 and the locking cavity 209 of the first base plate 207. In the second position, see FIG. 4c, the second casing 203 has been displaced in a first dimension in relation to the first casing 202 and been moved away from the first casing 202 in a second dimension. In the second position the locking projection 214 is arranged in the second cavity 210 of the second base plate 208.

To move the second casing 203 from the first position to the second position, a user of the radio communication terminal 201 grabs the first and the second casing 202, 203. The second casing 203 is moved in the first direction C in relation to the first casing 202. The direction C is a direction that is perpendicular to a plane between the first and the second casings 202, 203. As the second sliding plate 212 is mounted on the second casing 203 and the first sliding plate 211 is connected to the second base plate 208, the first sliding plate 211 will be moved in relation to the second sliding plate 212 when the second casing 203 is moved. As the second sliding plate 212 is moved the locking projection 214 will be moved and no longer be arranged in the locking cavity 209 of the first base plate 207 and the transport cavity 213 of the first sliding plate 211, see FIG. 4b.

The locking projection 214 is now unlocked and the second casing 203 is slided in the second direction D in relation to the first casing 202. As the second casing 203 is slided in relation the first casing 202, the first sliding plate 211 and the second base plate 208 is slidable moved in relation to each other.

When the first sliding plate 211 and the second sliding plate 212 has been slided such that the locking projection 214 is arranged above the second cavity 210 of the second base plate 208, the second sliding plate is moved in a direction that is opposite to the first direction C to arrange the projection in the second cavity of the second base plate. The first and the second casings 202, 203 are now arranged in the second position, see FIG. 4c.

The first direction C is perpendicular to the second direction D.

To once again arrange the first and second casing 202, 203 in the first position the steps disclosed above is reversed.

Figure 5:
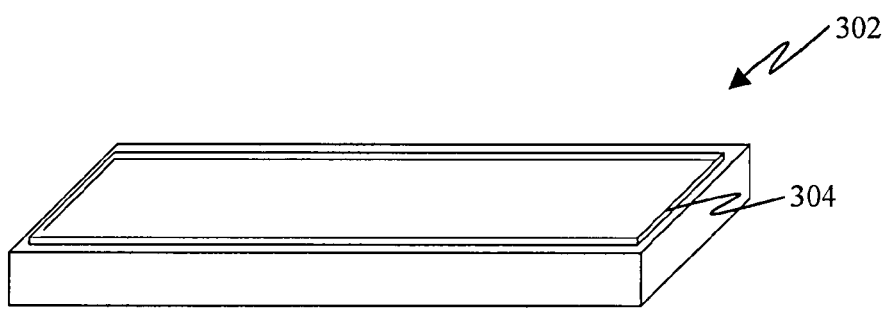
FIG. 5 schematically illustrates a perspective view of a first casing according to an embodiment of the invention.
Figure 6:
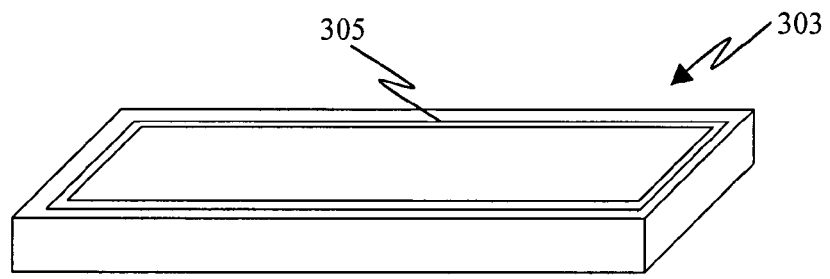
FIG. 6 schematically illustrates a perspective view of a second casing according to an embodiment of the invention.

FIG. 5, to which reference is made, discloses a firs casing 302 according to an embodiment of the invention. The first casing 302 comprise a flange 304. The flange 304 is arranged along the circumferential periphery of the side of the first casing 302 that is adapted to be directed towards the second casing. The flange 304 is made of a flexible or resilient material such as rubber. When the first casing 304 is arranged in the first position and pressed against the second casing as described in connection with the embodiment disclosed in FIG. 3, the flange 304 is pressed against the second casing. As the flange 304 is pressed against the second casing, the flange will seal off any play between the first and the second casing. The radio communication terminal will thereby be protected against dust and particles that otherwise could enter between the first and the second casing. The flange 304 and the pressing force of the connector could be adapted to make the radio communication terminal weather proof and protected against moist and water.

In a further embodiment which is disclosed in FIG. 5, a second casing 303 comprises a groove 305. The groove 305 is arranged along the circumferential periphery of the side of the second casing that is adapted to be directed towards the first casing. The second casing 304 is adapted cooperate with a first casing as described in FIG. 4. The shape of the groove 305 corresponds to the shape of the flange 304 of the first casing 302. As the first casing 302 is pressed against the second casing 303, the flange 304 will be arranged in the groove 305. The interaction of the flange 304 and the groove 305 will protect the radio communication terminal from that particles, moist and water enters between the first and the second casings 302, 303.

In a further embodiment the radio communication terminal could be adapted to let air flow between the first and the second casing in the second position. The air could be used to cool devices on the first and/or on the second casing. As the first and the second casing is moved in at least two dimensions in relation to each other, the flow of air could be stopped in the first position. As the flow of air is stopped in the first position the risk of that dust and particles enters between the first and the second casings is reduced.

The principles of the present invention have been described in the abovementioned by examples of embodiments or modes of operations. However, the invention should not be construed as being limited to the particular embodiments discussed above, which are illustrative rather than restrictive, and it should be appreciated that variations may be made in those embodiments by persons skilled in the art, without departing from the scope of the present invention as defined by the appended claims.

The invention claimed is:

1. Radio communication terminal comprising a first casing, a second casing and a slider mechanism, comprising a slider and a base, the slider is mounted on either one of the first casing and the second casing and the base is mounted on the other of the first casing and the second casing,
wherein the first casing is adapted to be moved in relation to the second casing in a first and a second direction between at least a first and a second position,
wherein said first and second directions are situated in a two dimensional plane, and
wherein one of the first and the second casings comprise a resilient flange arranged along the circumferential periphery of a side of said casing that is directed towards the other of the first and the second casing.

2. Radio communication terminal according to claim 1, wherein the first direction is a direction in which the first and the second casings are moved away from each other.

3. Radio communication terminal according to claim 1, wherein the second direction is a direction in which the first and the second casings are displaced in relation to each other.

4. Radio communication terminal according to claim 1, wherein the first position is a closed position, in which the first casing is arranged on top of the second casing, and the second position is a open position, in which the first casing is displaced in relation to the second casing.

5. Radio communication terminal according to claim 1, wherein the first casing is pressed against the second casing in the first position.

6. Radio communication terminal according to claim 1, wherein the first casing comprise a protrusion and the second casing comprise a cavity, wherein the protrusion is adapted to be arranged in the cavity of the second casing in the first position.

7. Radio communication terminal according to claim 1, wherein the first casing is locked against the second casing in the first position and wherein the first casing is adapted to be unlocked when the first casing is moved in the first direction.

8. Radio communication terminal according to claim 1, wherein the resilient flange of one of the first and the second casings is adapted to be pressed against the other of the first and the second casings in the first position.

9. Radio communication terminal according to claim 1, wherein the other of the first and the second casing comprise a groove, wherein the shape of the groove corresponds to the shape of the resilient flange and wherein the resilient flange is adapted to be arranged in the groove in the first position.

10. Radio communication terminal according to claim 1, wherein the one of the first and the second casings comprise a second cavity and the other of the first and the second casing comprise a device, wherein the device is adapted to be arranged at the second hole in the second position.

11. Radio communication terminal according to claim 10, wherein the device is a speaker and the second hole is a sound board.

12. Radio communication terminal according to claim 1, wherein the first casing is adapted to be slidable movable between the first and the second position.

13. Radio communication terminal according to claim 1, wherein the first casing is adapted to be moved in relation to the second casing in the first and the second direction simultaneously.

14. Radio communication terminal according to claim 1, wherein the first casing is adapted to be moved in relation to the second casing in a third direction in addition to the first and the second direction.

15. Radio communication terminal according to claim 14, wherein the third direction is situated in said two dimensional plane.

16. Radio communication terminal according to claim 14, wherein the first, second and third direction are directed in three dimensions.

17. Radio communication terminal according to claim 1, wherein the first direction is perpendicular to the second direction.

18. Radio communication terminal according to claim 1, wherein the first direction is perpendicular to the third direction.

* * * * *